(12) United States Patent
Garg et al.

(10) Patent No.: US 12,683,816 B2
(45) Date of Patent: Jul. 14, 2026

(54) SYSTEM AND METHOD FOR REVERSING ILLEGITIMATE INTERACTIONS BETWEEN COMPUTING SYSTEMS

(71) Applicant: Bank of America Corporation, Charlotte, NC (US)

(72) Inventors: Saurabh Garg, Faridabad (IN); Maneesh Kumar Sethia, Hyderabad (IN); Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 278 days.

(21) Appl. No.: 18/512,404

(22) Filed: Nov. 17, 2023

(65) Prior Publication Data

US 2025/0168022 A1     May 22, 2025

(51) Int. Cl.
H04L 9/00          (2022.01)

(52) U.S. Cl.
CPC ..................................... H04L 9/50 (2022.05)

(58) Field of Classification Search
CPC ....................................................... H04L 9/50
See application file for complete search history.

(56) References Cited

U.S. PATENT DOCUMENTS

| | | |
|---|---|---|
| 10,673,619 B1 | 6/2020 | Shi et al. |
| 10,936,580 B2 | 3/2021 | Shi et al. |
| 11,200,569 B1 | 12/2021 | James et al. |
| 11,216,820 B2 * | 1/2022 | Zhang ................... H04L 9/0637 |
| 11,295,359 B1 * | 4/2022 | Mullins ............. G06Q 10/0837 |
| 11,449,938 B2 | 9/2022 | Dalton et al. |
| 11,455,643 B2 | 9/2022 | Moustakas |
| 11,468,436 B2 | 10/2022 | Mayblum et al. |
| 2015/0302401 A1 | 10/2015 | Metral |
| 2017/0338947 A1 * | 11/2017 | Ateniese ............... H04L 9/0643 |
| 2019/0034919 A1 | 1/2019 | Nolan et al. |
| 2019/0095879 A1 | 3/2019 | Eyal et al. |
| 2019/0122258 A1 | 4/2019 | Bramberger et al. |
| 2019/0147438 A1 | 5/2019 | Micali et al. |
| 2020/0104927 A1 | 4/2020 | Walden et al. |
| 2021/0065300 A1 | 3/2021 | Leshner et al. |
| 2021/0065302 A1 | 3/2021 | Leshner et al. |
| 2022/0027900 A1 | 1/2022 | Suh et al. |
| 2022/0092587 A1 | 3/2022 | Jevans |

(Continued)

*Primary Examiner* — Blake I Narramore

(57)          ABSTRACT

A method includes analyzing a first block of a blockchain stored in a blockchain network. The first block is associated with an interaction between computing systems. Upon determining that the interaction is illegitimate, a first instruction is sent to the blockchain network to create and add a dispute block associated with a dispute of the interaction to the blockchain. Upon determining that the blockchain includes an intermediate block between the first block and the dispute block that is associated with a subsequent interaction that is performed after the interaction, source and destination computing systems for the interaction and the subsequent interaction are determined. Upon approving reversals of the interaction and the subsequent interaction, a second instruction is sent to each destination computing system to initiate a reversal of a respective interaction. A notification is sent to each source computing system that the reversal of the respective interaction is approved.

20 Claims, 3 Drawing Sheets

(56)         References Cited

U.S. PATENT DOCUMENTS

| | | | |
|---|---|---|---|
| 2022/0147993 A1 | 5/2022 | Fazliu et al. | |
| 2023/0004970 A1 | 1/2023 | Jakobsson et al. | |
| 2023/0006976 A1 | 1/2023 | Jakobsson et al. | |
| 2023/0281617 A1* | 9/2023 | Duris .................. | G06Q 20/407 |
| | | | 705/41 |
| 2023/0368206 A1* | 11/2023 | Turgeman .............. | G06F 21/32 |
| 2024/0007329 A1* | 1/2024 | Doney ................ | G06F 16/2379 |
| 2024/0161116 A1* | 5/2024 | Mohammed ......... | G06N 3/0464 |
| 2025/0265581 A1* | 8/2025 | Schoof .................. | H04L 9/0825 |

* cited by examiner

SYSTEM AND METHOD FOR REVERSING ILLEGITIMATE INTERACTIONS BETWEEN COMPUTING SYSTEMS

TECHNICAL FIELD

The present disclosure relates generally to security of computing systems, and more specifically to a system and method for reversing illegitimate interactions between computing systems.

BACKGROUND

Interactions between computing systems may be recorded in a blockchain of a blockchain network. The blockchain may include blocks associated with both legitimate and illegitimate interactions. An illegitimate interaction may be performed by a legitimate user by mistake or by a malicious user. The illegitimate interactions may degrade a security of computing systems and may cause data loss.

SUMMARY

The system described in the present disclosure provides several practical applications and technical advantages that overcome the current technical problems with security of computing systems.

In general, a system for reversing illegitimate interactions between computing systems may include an interaction management system operably coupled to a plurality of computing systems and a blockchain network via a network. The plurality of computing systems may be user devices of a plurality of users. The blockchain network may be configured to record interactions between the plurality of computing systems in a blockchain and may include a plurality of nodes.

The interaction management system is configured to analyze an interaction block of the blockchain. The interaction block may be associated with an interaction between a source computing system and a destination computing system. For example, the interaction may include exchange of digital assets between a user of the source computing system and a user of the destination computing system. The digital assets may be cryptocurrencies, non-fungible tokens (NFTs), and/or any suitable data items. The interaction management system determines a time that passed since performing the interaction and compares the time to a time threshold.

In response to determining that the time is less than the time threshold, the interaction management system determines if the interaction is illegitimate. Determining if the interaction is illegitimate may include implementing an artificial intelligence/machine learning (AI/ML) model. In certain embodiments, the interaction management system compares a historical behavior of the source computing system to a current behavior of the source computing system. In response to determining that the historical behavior matches the current behavior, the interaction management system determines that the interaction is legitimate. In response to determining that the historical behavior does not match the current behavior, the interaction management system determines that the interaction is illegitimate. In response to determining that the interaction is illegitimate, the interaction management system sends an instruction to the blockchain network. In response to receiving the instruction, the blockchain network creates a dispute block associated with a dispute of the interaction and adds the dispute block to the blockchain.

In response to determining that the time is greater than or equal to the time threshold, the interaction management system determines if a request to reverse the interaction is received from the source computing system. In response to determining that the request is received, the interaction management system sends an instruction to the blockchain network. In response to receiving the instruction, the blockchain network creates a dispute block associated with the dispute of the interaction and adds the dispute block to the blockchain.

After adding the dispute block to the blockchain, the interaction management system determines if the blockchain includes one or more intermediate interaction blocks between the interaction block and the dispute block. The one or more intermediate interaction blocks are associated with one or more subsequent interactions that are performed after performing the interaction and before adding the dispute block.

In response to determining that the blockchain includes the one or more intermediate interaction blocks between the interaction block and the dispute block, the interaction management system determines source computing systems and destination computing systems for the interaction and the one or more subsequent interactions based on the interaction block and the one or more intermediate interaction blocks. The interaction management system determines, based on interaction reversal rules, if reversals of the interaction and the one or more subsequent interactions are approved. The interaction reversal rules may include rules based on source computing systems, rules based on destination computing systems, rules based on users, and/or rules based on types of interactions. In response to determining that the reversals of the interaction and the one or more subsequent interactions are approved, the interaction management system sends an instruction to each destination computing system to initiate a reversal of a respective interaction. In response to receiving the instruction, the blockchain network creates a reversal block associated with the reversal of the respective interaction, validates the reversal block, and adds the reversal block to blockchain. The interaction management system sends a notification to each source computing system that the reversal of the respective interaction is approved.

In response to determining that the blockchain includes no intermediate interaction blocks between the interaction block and the dispute block, the interaction management system determines the source computing system and the destination computing system for the interaction based on the interaction block and determines, based on the interaction reversal rules, if a reversal of the interaction is approved. In response to determining that the reversal of the interaction is approved, the interaction management system sends an instruction to the destination computing system to initiate a reversal of the interaction. In response to receiving the instruction, the blockchain network creates a reversal block associated with the reversal of the interaction, validates the reversal block, and adds the reversal block to blockchain. The interaction management system sends a notification to the source computing system that the reversal of the interaction is approved.

The present disclosure provides various advantages. The system allows for reversing illegitimate interactions between computing systems. By reversing the illegitimate interactions, a network security of computing systems may be improved. Furthermore, data loss due to illegitimate interactions may be also reduced or prevented. In an example when an illegitimate interaction includes exchanging a digital asset, loss of the digital asset may be reduced or prevented. Accordingly, the following disclosure is particularly integrated into practical applications of: (1) reversing illegitimate interaction between computing systems; (2) improving a network security of computing systems; and (3) reducing or preventing data loss.

In one embodiment, a system includes a memory and a processor operably coupled to the memory. The memory is configured to store a time threshold and interaction reversal rules. The processor is configured to analyze a first block of a blockchain stored in a blockchain network. The first block is associated with a first interaction between a first source computing system and a first destination computing system. The processor is further configured to determine a first time that passed since performing the first interaction and in response to determining that the first time is less than the time threshold, determine if the first interaction is illegitimate. In response to determining that the first interaction is illegitimate, the processor is further configured to send a first instruction to the blockchain network to create a first dispute block associated with a dispute of the first interaction and add the first dispute block to the blockchain. The processor is further configured to determine if the blockchain includes one or more first intermediate blocks between the first block and the first dispute block. The one or more first intermediate blocks are associated with one or more first subsequent interactions that are performed after the first interaction. In response to determining that the blockchain includes the one or more first intermediate blocks between the first block and the first dispute block, the processor is further configured to determine first source computing systems and first destination computing systems for the first interaction and the one or more first subsequent interactions based on the first block and the one or more first intermediate blocks, and determine, based on the interaction reversal rules, if reversals of the first interaction and the one or more first subsequent interactions are approved. In response to determining that the reversals of the first interaction and the one or more first subsequent interactions are approved, the processor is further configured to send a second instruction to each first destination computing system to initiate a reversal of a first respective interaction. In response to initiating the reversal of the first respective interaction, the blockchain network is configured to create a first reversal block associated with the reversal of the first respective interaction, validate the first reversal block, and add the first reversal block to the blockchain. The processor is further configured to send a first notification to each first source computing system that the reversal of the first respective interaction is approved.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
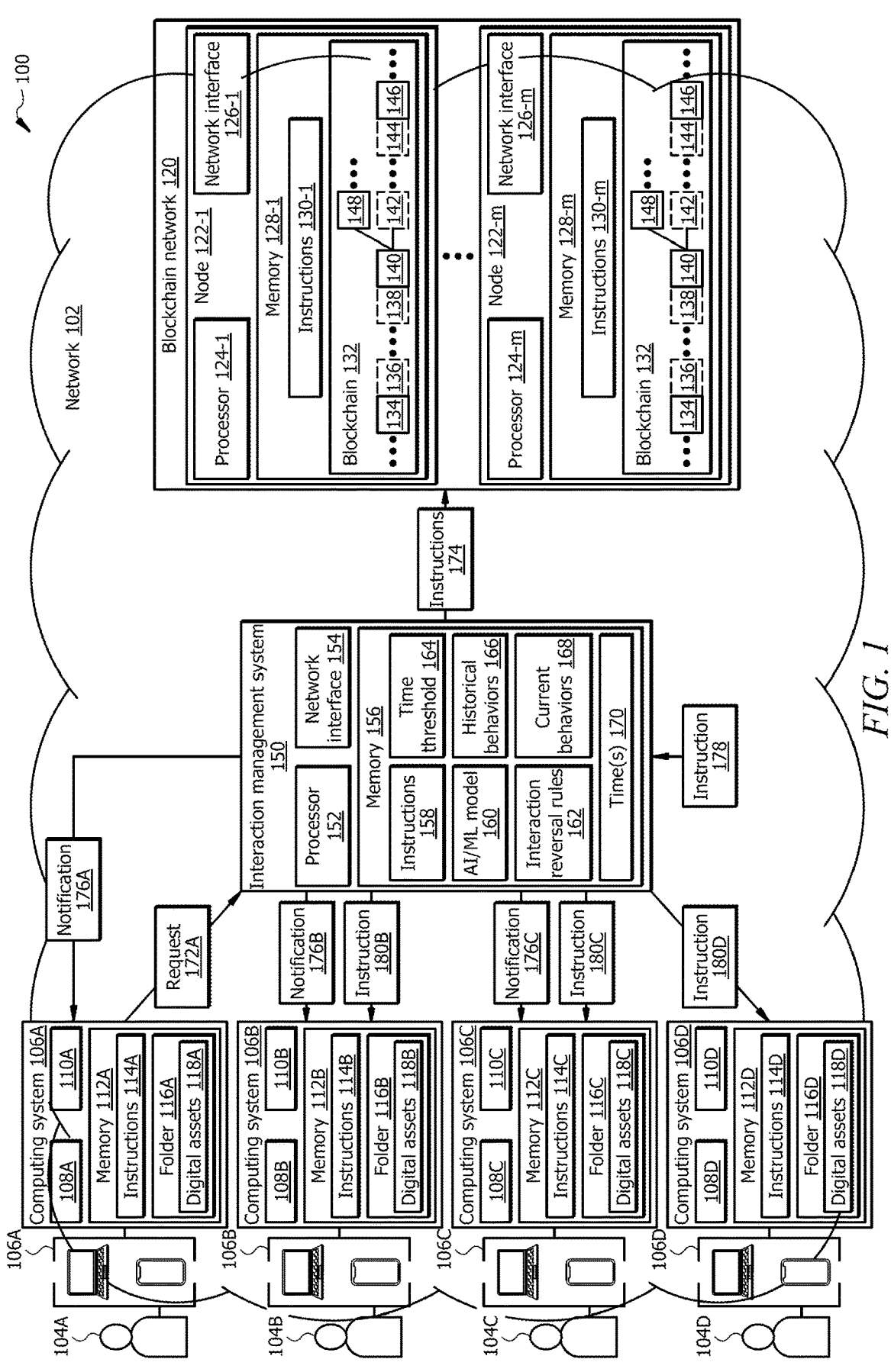
FIG. 1 illustrates an embodiment of a system configured for reversing illegitimate interactions between computing systems.
Figure 2A:
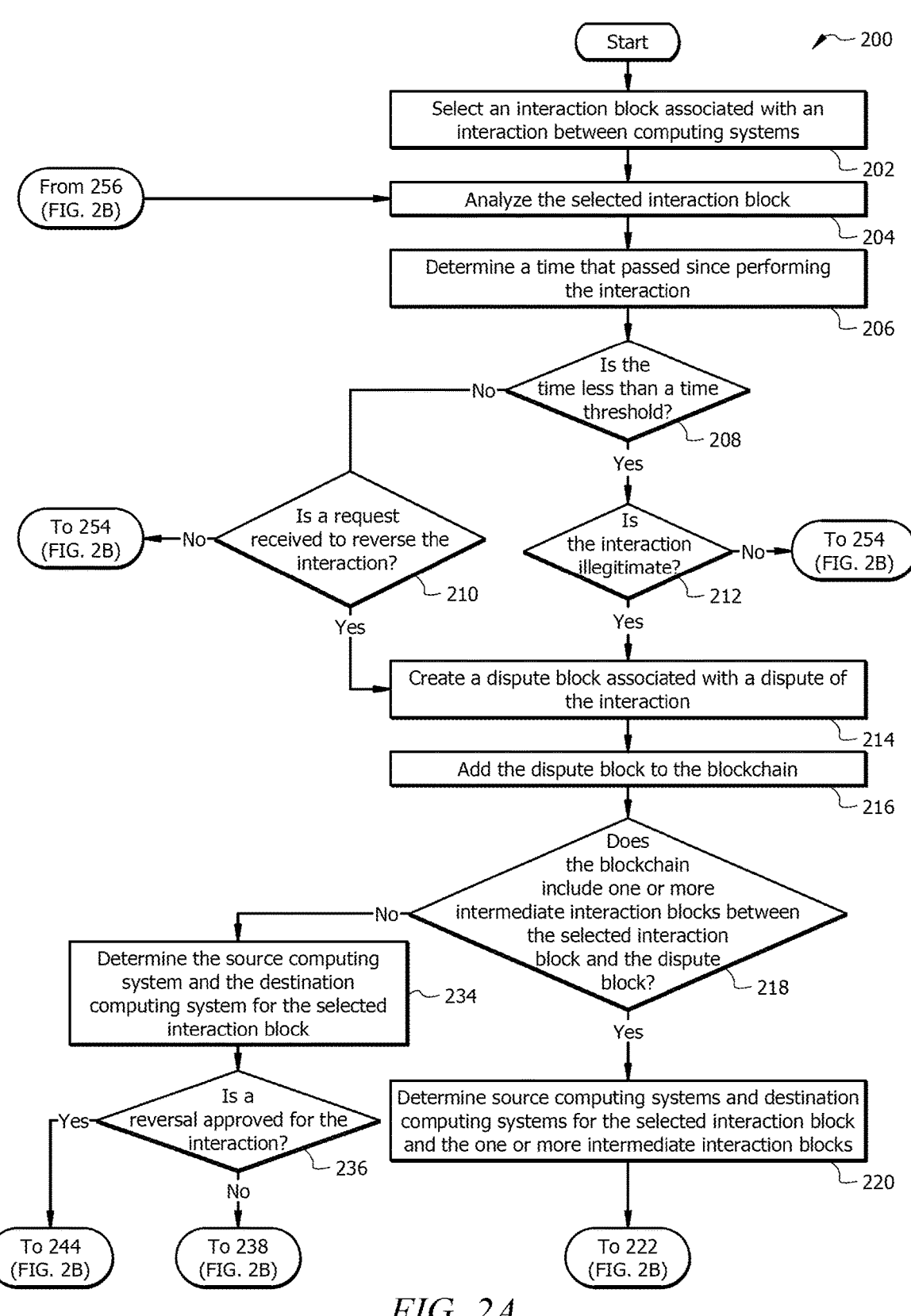
FIGS. 2A and 2B illustrate an example operational flow of system of FIG. 1 for reversing illegitimate interactions between computing systems.
Figure 2B:
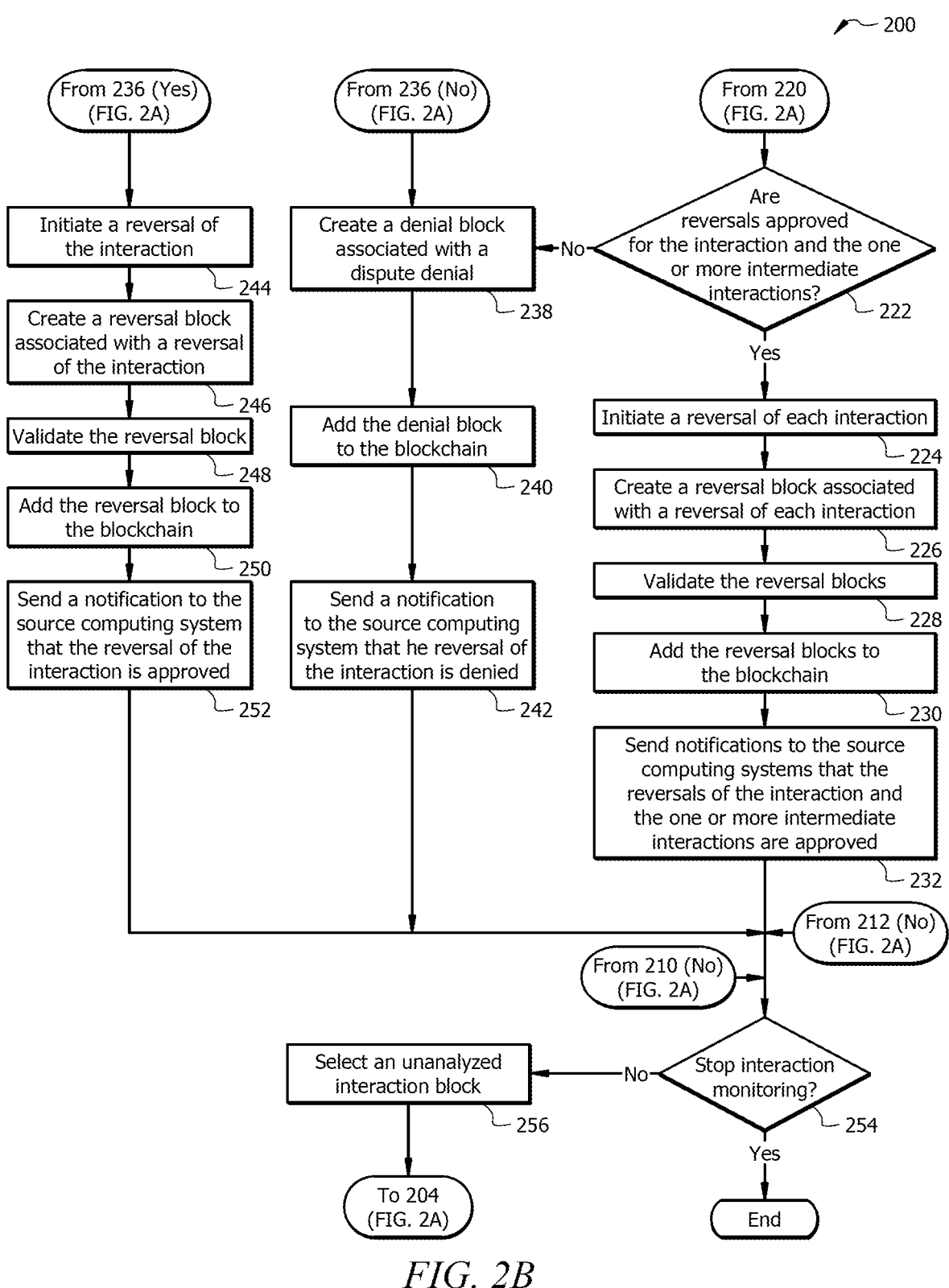

As described above, previous technologies fail to provide efficient and reliable solutions for security of computing systems. Embodiments of the present disclosure and its advantages may be understood by referring to FIGS. 1, 2A, and 2B. FIGS. 1, 2A, and 2B are used to describe a system and method for reversing illegitimate interactions between computing systems.

System Overview

FIG. 1 illustrates an embodiment of a system 100 that is generally configured for reversing illegitimate interactions between computing systems. In certain embodiments, the system 100 comprises an interaction management system 150 that is operably coupled to computing systems 106A through 106D of users 104A through 104D and a blockchain network 120 via a network 102. Network 102 enables the communication between the components of the system 100. The computing systems 106A through 106D may be also referred to as user devices. The blockchain network 120 comprises a peer-to-peer network of nodes 122-1 through 122-$m$. In other embodiments, system 100 may not have all the components listed and/or may have other elements instead of, or in addition to, those listed above.

In general, the interaction management system 150 selects an interaction block (e.g., block 134) associated with an interaction between a source computing system (e.g., computing system 106A) and a destination computing system (e.g., computing system 106B). The interaction block (e.g., block 134 is recorded in a blockchain 132 stored in the blockchain network 120. The interaction management system 150 analyzes the selected interaction block (e.g., block 134) and determines a time (e.g., time 170) that passed since performing the interaction associated with the selected interaction block (e.g., block 134).

In response to determining that the time (e.g., time 170) is greater than or equal to a time threshold (e.g., time threshold 164), the interaction management system 150 determines if a request (e.g., request 172A) to reverse the interaction associated with the selected interaction block (e.g., block 134) is received from the source computing system (e.g., computing system 106A). In response to determining the request (e.g., request 172A) to reverse the interaction associated with the selected interaction block (e.g., block 134) is received from the source computing system (e.g., computing system 106A), the interaction management system 150 sends an instruction (e.g., respective one of instructions 174) to the blockchain network 120 to create a dispute block (e.g., block 140) associated with disputing of the interaction associated with the selected interaction block (e.g., block 134). In response to receiving the instruction (e.g., respective one of instructions 174), the blockchain network 120 creates the dispute block (e.g., block 140) associated with disputing of the interaction associated with the selected interaction block (e.g., block 134).

In response to determining that the time (e.g., time 170) is less than the time threshold (e.g., time threshold 164), the interaction management system 150 determines if the interaction associated with the selected interaction block (e.g., block 134) is illegitimate.

In response to determining that the interaction associated with the selected interaction block (e.g., block 134) is illegitimate, the interaction management system 150 sends an instruction (e.g., respective one of instructions 174) to the blockchain network 120 to create a dispute block (e.g., block 140) associated with disputing of the interaction associated with the selected interaction block (e.g., block 134). In response to receiving the instruction (e.g., respective one of instructions 174), the blockchain network 120 creates the dispute block (e.g., block 140) associated with disputing of the interaction associated with the selected interaction block (e.g., block 134).

After creating the dispute block (e.g., block 140), the blockchain network 120 adds the dispute block (e.g., block 140) to the blockchain 132. The interaction management system 150 determines if the blockchain 132 includes one or more intermediate interaction blocks (e.g., blocks 136 through 138) between the selected interaction block (e.g., block 134) and the dispute block (e.g., block 140).

In response to determining that the blockchain 132 includes the one or more intermediate interaction blocks (e.g., blocks 136 through 138) between the selected interaction block (e.g., block 134) and the dispute block (e.g., block 140), the interaction management system 150 determines source computing systems (e.g., computing systems 106A through 106C) and destination computing systems (e.g., computing systems 106B through 106D) for the interaction and the one or more subsequent interactions based on the selected interaction block (e.g., block 134) and the one or more intermediate interaction blocks (e.g., blocks 136 through 138). The interaction management system 150 determines, based on interaction reversal rules 162, if reversals are approved for the interaction associated with the selected interaction block (e.g., block 134) and the one or more subsequent interactions associated with the one or more intermediate interaction blocks (e.g., blocks 136 through 138).

In response to determining that the reversals of the interaction associated with the selected interaction block (e.g., block 134) and the one or more subsequent interactions associated with the one or more intermediate interaction blocks (e.g., blocks 136 through 138) are approved, the interaction management system 150 sends an instruction (e.g., respective one of instructions 180B through 180D) to each destination computing system (e.g. respective one of computing systems 106B through 106D) to initiate a reversal of a respective interaction (e.g., respective one of interactions associated with the selected interaction block 134 and the intermediate interaction blocks 136 through 138).

In response to receiving the instruction (e.g., respective one of instructions 180B through 180D), the blockchain network 120 creates a reversal block (e.g., respective one of blocks 142 through 144 and 146) associated with the reversal of each of the interaction associated with the selected interaction block (e.g., block 134) and the one or more subsequent interactions associated with the one or more intermediate interaction blocks (e.g., blocks 136 through 138). In certain embodiment, the blockchain network 120 creates a reversal block 142 for a subsequent interaction associated with the intermediate interaction block 138, a reversal block 144 for a subsequent interaction associated with the intermediate interaction block 136, and a reversal block 146 for the interaction associated with the selected interaction block 134. The blockchain network 120 validates the reversal blocks 142 through 144 and 146 based on proof of importance. The validation process based on proof of importance may comprise a validation process based on proof of authority, a validation process based on proof of work, or a validation process based on proof of stake. The blockchain network 120 adds the reversal blocks 142 through 144 and 146 to the blockchain 132. The interaction management system 150 sends a notification (e.g., respective one of notifications 176A through 176C) to each source computing system (e.g., respective one of computing systems 106A through 106C) that the reversal of the respective interaction is approved.

In response to determining that the blockchain 132 does not includes the one or more intermediate interaction blocks (e.g., blocks 136 through 138) between the selected interaction block (e.g., block 134) and the dispute block (e.g., block 140), the interaction management system 150 determines a source computing system (e.g., computing system 106A) and a destination computing system (e.g., computing system 106B) for the selected interaction block (e.g., block 134). The interaction management system 150 determines, based on interaction reversal rules 162, if a reversal is approved for the interaction associated with the selected interaction block (e.g., block 134). In response to determining the reversal of the interaction associated with the selected interaction block (e.g., block 134) is approved, the interaction management system 150 sends an instruction (e.g., instruction 180A) to the source computing system (e.g., computing system 106A) associated with the selected interaction block (e.g., block 134) to initiate a reversal of the interaction associated with the selected interaction block (e.g., block 134).

In response to receiving the instruction (e.g., instruction 180A), the blockchain network 120 creates a reversal block (e.g., block 146) associated with a reversal of the interaction associated with the selected interaction block (e.g., block 134) and validates the reversal block 146 based on proof of importance. The validation process based on proof of importance may comprise a validation process based on proof of authority, a validation process based on proof of work, or a validation process based on proof of stake. The blockchain network 120 adds the reversal block 146 to the blockchain 132. The interaction management system 150 sends a notification (e.g., notification 176A) to the source computing system (e.g., computing system 106A) associated with the selected interaction block (e.g., block 134) that the reversal of the interaction associated with the selected interaction block (e.g., block 134) is approved.

In response to determining that the reversals of the interaction associated with the selected interaction block (e.g., block 134) and/or the one or more subsequent interactions associated with the one or more intermediate interaction blocks (e.g., blocks 136 through 138) are not approved, the interaction management system 150 sends an instruction (e.g., respective one of instructions 174) to the blockchain network 120 to create a denial block (e.g., block 148) associated with a dispute denial. In response to receiving the instruction (e.g., respective one of instructions 174), the blockchain network 120 creates the denial block (e.g., block 148) and adds the denial block (e.g., block 148) to the blockchain 132. The interaction management system 150 sends a notification (e.g., notifications 176A) to the source computing system (e.g., computing system 106A) associated with the selected interaction block (e.g., block 134) that the reversal of the interaction associated with the selected interaction block (e.g., block 134) is denied.

In certain embodiments, the interaction monitoring process may be repeated for other unanalyzed blocks of the blockchain 132 until an instruction (e.g., instruction 178 of FIG. 1) to stop the interaction monitoring process is received by the interaction management system 150.

System Components

Network

Network 102 may be any suitable type of wireless and/or wired network. Network 102 may or may not be connected to the Internet or public network. Network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. Network 102 may be configured to support any suitable type of communication protocol as would be appreciated by one of ordinary skill in the art.

Computing Systems

The computing systems 106A through 106D are generally any devices that are configured to process data and interact with the users 104A through 104D. The computing systems 106A through 106D may be also referred to as user devices. Examples of the computing systems 106A through 106D include, but are not limited to, a personal computer, a desktop computer, a workstation, a server, a laptop, a tablet computer, a mobile phone (such as a smartphone), a virtual reality headset, etc. The computing systems 106A through 106D may include a user interface, such as a display, a microphone, keypad, or other appropriate terminal equipment usable by the users 104A through 104D. Each of the computing systems 106A through 106D further comprises a respective one of processors 108A through 108D in signal communication with a respective one of memories 112A through 112D and a respective one of network interfaces 110A through 110D. Each of the processors 108A through 108D may comprise one or more processors operably coupled to a respective one of the memories 112A through 112D.

Each of the processors 108A through 108D is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 108A through 108D may be a programmable logic device, a microcontroller, a microprocessor, or any suitable combination of the preceding. The one or more processors are configured to process data and may be implemented in hardware or software. For example, each of the processors 108A through 108D may be 8-bit, 16-bit, 32-bit, 64-bit, or of any other suitable architecture. Each of the processors 108A through 108D is configured to implement various software instructions. For example, each of the processors 108A through 108D is configured to execute respective ones of software instructions 114A through 114D that are stored in a respective one of the memories 112A through 112D in order to perform the operations described herein.

Each of the network interfaces 110A through 110D is configured to enable wired and/or wireless communications (e.g., via network 102). Each of the network interfaces 110A through 110D is configured to communicate data between a respective one of the computing systems 106A through 106D and other components of the system 100. For example, each of the network interfaces 110A through 110D may comprise a WIFI interface, a local area network (LAN) interface, a wide area network (WAN) interface, a modem, a switch, or a router. Each of the network interfaces 110A through 110D may be configured to use any suitable type of communication protocol as would be appreciated by one of ordinary skill in the art.

Each of the memories 112A through 112D comprises a non-transitory computer-readable medium such as one or more disks, tape drives, or solid-state drives, and may be used as an over-flow data storage device, to store programs when such programs are selected for execution, and to store instructions and data that are read during program execution. Each of the memories 112A through 112D may be volatile or non-volatile and may comprise a read-only memory (ROM), random-access memory (RAM), ternary content-addressable memory (TCAM), dynamic random-access memory (DRAM), and static random-access memory (SRAM). Each of the memories 112A through 112D may be implemented using one or more disks, tape drives, solid-state drives, and/or the like. Each of the memories 112A through 112D may store any of the information described in FIGS. 1, 2A, and 2B along with any other data, instructions, logic, rules, or code operable to implement the function(s) described herein. Each of the memories 112A through 112D is operable to store respective ones of software instructions 114A through 114D, and/or any other data and instructions. Each of the software instructions 114A through 114D may comprise any suitable set of software instructions, logic, rules, or code operable to be executed by respective one of the processors 108A through 108D.

Each of the memories 112A through 112D is further configured to store a respective one of folders 116A through 116D. Each of the folders 116A through 116D comprises a respective one of digital assets 118A through 118D. In certain embodiments, each of the digital assets 118A through 118D may comprise cryptocurrencies (e.g., Bitcoin, Ethereum, etc.), non-fungible tokens (NFTs), and/or any suitable data items. In such embodiments, the folders 116A through 116D may be also referred to as digital wallets.

In operation, the computing systems 106A though 106D are configured to send requests (e.g., request 172A) to the interaction management system 150 and receive various notifications (e.g., notifications 176A through 176C) and instructions (e.g., instructions 180B through 180D) from the interaction management system 150.

Blockchain Network

The blockchain network 120 comprises a peer-to-peer network of nodes 122-1 through 122-m and is configured to record interactions between the computing systems 106A through 106D in a blockchain 132. In certain embodiments, the interactions between the computing systems 106A through 106D may comprise exchanges of the digital assets 118A through 118D.

Each of the nodes 122-1 through 122-m is generally any device that is configured to process data and communicate with other components of the system 100 via the network 102. Each of the nodes 122-1 through 122-m comprises a respective one of processors 124-1 through 124-m in signal communication with a respective one of memories 128-1 through 128-m and a respective one of network interfaces 126-1 through 126-*m*. Each of the processors 124-1 through 124-*m* may comprise one or more processors operably coupled to a respective one of the memories 128-1 through 128-*m*.

Each of the processors 124-1 through 124-*m* is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 124-1 through 124-*m* may be a programmable logic device, a microcontroller, a microprocessor, or any suitable combination of the preceding. The one or more processors are configured to process data and may be implemented in hardware or software. For example, each of the processors 124-1 through 124-*m* may be 8-bit, 16-bit, 32-bit, 64-bit, or of any other suitable architecture. Each of the processors 124-1 through 124-*m* is configured to implement various software instructions. For example, each of the processors 124-1 through 124-*m* is configured to execute respective ones of software instructions 130-1 through 130-*m* that are stored in a respective one of the memories 128-1 through 128-*m* in order to perform the operations described herein.

Each of the network interfaces 126-1 through 126-*m* is configured to enable wired and/or wireless communications (e.g., via network 102). Each of the network interfaces 126-1 through 126-*m* is configured to communicate data between a respective one of the nodes 122-1 through 122-*m* and other components of the system 100. For example, each of the network interfaces 126-1 through 126-*m* may comprise a WIFI interface, a local area network (LAN) interface, a wide area network (WAN) interface, a modem, a switch, or a router. Each of the network interfaces 126-1 through 126-*m* may be configured to use any suitable type of communication protocol as would be appreciated by one of ordinary skill in the art.

Each of the memories 128-1 through 128-*m* comprises a non-transitory computer-readable medium such as one or more disks, tape drives, or solid-state drives, and may be used as an over-flow data storage device, to store programs when such programs are selected for execution, and to store instructions and data that are read during program execution. Each of the memories 128-1 through 128-*m* may be volatile or non-volatile and may comprise a read-only memory (ROM), random-access memory (RAM), ternary content-addressable memory (TCAM), dynamic random-access memory (DRAM), and static random-access memory (SRAM). Each of the memories 128-1 through 128-*m* may be implemented using one or more disks, tape drives, solid-state drives, and/or the like. Each of the memories may store any of the information described in FIGS. 1, 2A, and 2B along with any other data, instructions, logic, rules, or code operable to implement the function(s) described herein. Each of the memories 128-1 through 128-*m* is operable to store respective ones of software instructions 130-1 through 130-*m*, and/or any other data and instructions. Each of the software instructions 130-1 through 130-*m* may comprise any suitable set of software instructions, logic, rules, or code operable to be executed by respective one of the processors 124-1 through 124-*m*.

Each of the memories 128-1 through 128-*m* is further configured to store a copy of a blockchain 132. Each copy of the blockchain 132 comprises a plurality of blocks 134 through 148. In certain embodiments, the blockchain 132 comprises a plurality of blocks (e.g., blocks 134 through 148). Blocks 134 through 138 may be also referred to as interaction blocks. Block 140 may be referred to as a dispute block. Blocks 142 through 146 may be also referred to as reversal blocks. Block 148 may be referred to as a denial block. In other embodiments, the blockchain 132 may not include the blocks 136 through 138. In such embodiments, the blockchain 132 does not include the blocks 142 through 144.

In operation, the blockchain network 120 is configured to receive instructions 174 from the interaction management system 150 to create the plurality of blocks (e.g., blocks 134 through 148). The blockchain network 120 is further configured to validate the blocks based on proof of importance. The validation process based on proof of importance may comprise a validation process based on proof of authority, a validation process based on proof of work, or a validation process based on proof of stake. Upon validation, the blockchain network 120 is further configured to add the blocks to the blockchain 132.

Interaction Management System

The interaction management system 150 is generally any device that is configured to process data and communicate with other components of the system 100 via the network 102. The interaction management system 150 may comprise a processor 152 in signal communication with a memory 156 and a network interface 154.

Processor 152 comprises one or more processors operably coupled to the memory 156. Processor 152 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 152 may be a programmable logic device, a microcontroller, a microprocessor, or any suitable combination of the preceding. The one or more processors are configured to process data and may be implemented in hardware or software. Processor 152 may be 8-bit, 16-bit, 32-bit, 64-bit, or of any other suitable architecture. The one or more processors are configured to implement various software instructions to perform the operations described herein. For example, the one or more processors are configured to execute software instructions 158 and an artificial intelligence/machine learning (AI/ML) model 160 to perform one or more functions of the interaction management system 150 described herein.

Network interface 154 is configured to enable wired and/or wireless communications (e.g., via network 102). Network interface 154 is configured to communicate data between the interaction management system 150 and other components of the system 100. For example, network interface 154 may comprise a WIFI interface, a local area network (LAN) interface, a wide area network (WAN) interface, a modem, a switch, or a router. Processor 152 is configured to send and receive data using the network interface 154. Network interface 154 may be configured to use any suitable type of communication protocol as would be appreciated by one of ordinary skill in the art.

The memory 156 comprises a non-transitory computer-readable medium such as one or more disks, tape drives, or solid-state drives, and may be used as an over-flow data storage device, to store programs when such programs are selected for execution, and to store instructions and data that are read during program execution. Memory 156 may be volatile or non-volatile and may comprise a read-only memory (ROM), random-access memory (RAM), ternary content-addressable memory (TCAM), dynamic random-access memory (DRAM), and static random-access memory (SRAM). Memory 156 may be implemented using one or more disks, tape drives, solid-state drives, and/or the like. Memory 156 may store any of the information described in FIGS. 1, 2A, and 2B along with any other data, instructions, logic, rules, or code operable to implement the function(s) described herein. Memory 156 is operable to store software instructions 158, an AI/ML model 160, and/or any other data and instructions. The software instructions 158 may comprise any suitable set of software instructions, logic, rules, or code operable to be executed by processor 152. The AI/ML model 160 may comprise a neural network model or a natural language processing (NLP) model that operable to be executed by processor 152.

In operation, the processor 152 of the interaction management system 150 selects an interaction block (e.g., block 134) associated with an interaction between a source computing system (e.g., computing system 106A) and a destination computing system (e.g., computing system 106B). The interaction block (e.g., block 134) is recorded in a blockchain 132 stored in the blockchain network 120. The processor 152 of the interaction management system 150 analyzes the selected interaction block (e.g., block 134) and determines a time (e.g., time 170) that passed since performing the interaction associated with the selected interaction block (e.g., block 134). The processor 152 of the interaction management system 150 determines if the time (e.g., time 170) is less than a time threshold (e.g., time threshold 164).

In response to determining that the time (e.g., time 170) is greater than or equal to the time threshold (e.g., time threshold 164), the processor 152 of the interaction management system 150 determines if a request (e.g., request 172A) to reverse the interaction associated with the selected interaction block (e.g., block 134) is received from the source computing system (e.g., computing system 106A). For example, a user (e.g., user 104A) of the source computing system (e.g., computing system 106A) may determine that the interaction was performed in error and may instruct the source computing system (e.g., computing system 106A) to send the request (e.g., request 172A) to the interaction management system 150 to reverse the interaction associated with the selected interaction block (e.g., block 134). In response to determining the request (e.g., request 172A) to reverse the interaction associated with the selected interaction block (e.g., block 134) is received from the source computing system (e.g., computing system 106A), the processor 152 of the interaction management system 150 sends an instruction (e.g., respective one of instructions 174) to the blockchain network 120 to create a dispute block (e.g., block 140) associated with disputing of the interaction associated with the selected interaction block (e.g., block 134).

In response to determining that the time (e.g., time 170) is less than the time threshold (e.g., time threshold 164), the processor 152 of the interaction management system 150 determines if the interaction associated with the selected interaction block (e.g., block 134) is illegitimate. Determining if the interaction is illegitimate may comprise implementing an AI/ML model (e.g., AI/ML model 160) by the processor 152. In certain embodiments, the processor 152 of the interaction management system 150 compares a historical behavior (e.g., historical behavior 166) of the source computing system (e.g., computing system 106A) to a current behavior (e.g., current behavior 168) of the source computing system (e.g., computing system 106A). In response to determining that the historical behavior (e.g., historical behavior 166) of the source computing system (e.g., computing system 106A) does not match the current behavior (e.g., current behavior 168) of the source computing system (e.g., computing system 106A), the processor 152 of the interaction management system 150 determines that the interaction associated with the selected interaction block (e.g., block 134) is illegitimate. In response to determining that the historical behavior (e.g., historical behavior 166) of the source computing system (e.g., computing system 106A) matches the current behavior (e.g., current behavior 168) of the source computing system (e.g., computing system 106A), the processor 152 of the interaction management system 150 determines that the interaction associated with the selected interaction block (e.g., block 134) is legitimate.

In response to determining that the interaction associated with the selected interaction block (e.g., block 134) is illegitimate, the processor 152 of the interaction management system 150 sends an instruction (e.g., respective one of instructions 174) to the blockchain network 120 to create a dispute block (e.g., block 140) associated with disputing of the interaction associated with the selected interaction block (e.g., block 134). After sending the instruction (e.g., respective one of instructions 174) to the blockchain network 120, the processor 152 of the interaction management system 150 determines if the blockchain 132 includes one or more intermediate interaction blocks (e.g., blocks 136 through 138) between the selected interaction block (e.g., block 134) and the dispute block (e.g., block 140). In certain embodiments, one or more interactions may be performed and recorded in the blockchain 132 after performing the interaction associated with the selected interaction block (e.g., block 134) and before adding the dispute block (e.g., block 142) to the blockchain 132. In certain embodiments, an interaction between the computing system 106B and the computing system 106C may be recorded in the blockchain 132 as a block 136 and an interaction between the computing system 106C and the computing system 106D may be recorded in the blockchain 132 as a block 138.

In response to determining that the blockchain 132 includes the one or more intermediate interaction blocks (e.g., blocks 136 through 138) between the selected interaction block (e.g., block 134) and the dispute block (e.g., block 140), the processor 152 of the interaction management system 150 determines source computing systems (e.g., computing systems 106A through 106C) and destination computing systems (e.g., computing systems 106B through 106D) for the interaction and the one or more subsequent interactions based on the selected interaction block (e.g., block 134) and the one or more intermediate interaction blocks (e.g., blocks 136 through 138). In certain embodiments, the processor 152 of the interaction management system 150 determines a source computing system and a destination computing system of the interaction associated with the selected interaction block (e.g., block 134) as the computing system 106A and the computing system 106B, respectively, a source computing system and a destination computing system of a subsequent interaction associated with the intermediate interaction block 136 as the computing system 106B and the computing system 106C, respectively, and a source computing system and a destination computing system of a subsequent interaction associated with the intermediate interaction block 138 as the computing system 106C and the computing system 106D, respectively.

The processor 152 of the interaction management system 150 determines, based on interaction reversal rules 162, if reversals are approved for the interaction associated with the selected interaction block (e.g., block 134) and the one or more subsequent interactions associated with the one or more intermediate interaction blocks (e.g., blocks 136 through 138). The interaction reversal rules 162 may include rules based on source computing systems (e.g., respective ones of computing systems 106A through 106D), rules based on destination computing systems (e.g., respective ones of computing systems 106A through 106D), rules based on users (e.g., users 104A through 104D) and/or rules based on types of interactions (e.g., based on types of digital assets 118A through 118D).

In response to determining that the reversals of the interaction associated with the selected interaction block (e.g., block 134) and the one or more subsequent interactions associated with the one or more intermediate interaction blocks (e.g., blocks 136 through 138) are approved, the processor 152 of the interaction management system 150 sends an instruction (e.g., respective one of instructions 180B through 180D) to each destination computing system (e.g. respective one of computing systems 106B through 106D) to initiate a reversal of a respective interaction (e.g., respective one of interactions associated with the selected interaction block 134 and the intermediate interaction blocks 136 through 138). The processor 152 of the interaction management system 150 sends a notification (e.g., respective one of notifications 176A through 176C) to each source computing system (e.g., respective one of computing systems 106A through 106C) that the reversal of the respective interaction is approved.

In response to determining that the blockchain 132 does not includes the one or more intermediate interaction blocks (e.g., blocks 136 through 138) between the selected interaction block (e.g., block 134) and the dispute block (e.g., block 140), the processor 152 of the interaction management system 150 determines a source computing system (e.g., computing system 106A) and a destination computing system (e.g., computing system 106B) for the selected interaction block (e.g., block 134). The processor 152 of the interaction management system 150 determines, based on interaction reversal rules 162, if a reversal is approved for the interaction associated with the selected interaction block (e.g., block 134).

In response to determining that the reversal of the interaction associated with the selected interaction block (e.g., block 134) is approved, the processor 152 of the interaction management system 150 sends an instruction (e.g., instruction 180A) to the source computing system (e.g., computing system 106A) associated with the selected interaction block (e.g., block of FIG. 1) to initiate a reversal of the interaction associated with the selected interaction block (e.g., block 134). The processor 152 of the interaction management system 150 sends a notification (e.g., notification 176A) to the source computing system (e.g., computing system 106A) associated with the selected interaction block (e.g., block 134) that the reversal of the interaction associated with the selected interaction block (e.g., block 134) is approved.

In response to determining that the reversals of the interaction associated with the selected interaction block (e.g., block 134) and/or the one or more subsequent interactions associated with the one or more intermediate interaction blocks (e.g., blocks 136 through 138) are not approved, the processor 152 of the interaction management system 150 sends an instruction (e.g., respective one of instructions 174) to the blockchain network 120 to create a denial block (e.g., block 148) associated with a dispute denial. The processor 152 of the interaction management system 150 sends a notification (e.g., notifications 176A) to the source computing system (e.g., computing system 106A) associated with the selected interaction block (e.g., block

134) that the reversal of the interaction associated with the selected interaction block (e.g., block 134) is denied.

In certain embodiments, the interaction monitoring process may be repeated for other unanalyzed blocks of the blockchain 132 until an instruction (e.g., instruction 178 of FIG. 1) to stop the interaction monitoring process is received by the interaction management system 150.

Example Method for Reversing Illegitimate Interactions Between Computing Systems FIGS. 2A and 2B illustrate an example flowchart of a method 200 for reversing illegitimate interactions between computing systems. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., software instructions 114A through 114D, 130-1 through 130-m, 158 and/or AI/ML model 160 of FIG. 1), stored on non-transitory, tangible, machine-readable medium (e.g., memories 112A through 112D, 128-1 through 128-m and/or 156 of FIG. 1) that when executed by one or more processors (e.g., processors 108A through 108D, 124-1 through 124-m and/or 152 of FIG. 1) may cause the one or more processors to perform operations 202-256.

Method 200 starts with operation 202, where the processor 152 of the interaction management system 150 selects an interaction block (e.g., block 134 of FIG. 1) associated with an interaction between a source computing system (e.g., computing system 106A of FIG. 1) and a destination computing system (e.g., computing system 106B of FIG. 1). The interaction block (e.g., block 134 of FIG. 1) is recorded in a blockchain 132 stored in the blockchain network 120. At operation 204, the processor 152 of the interaction management system 150 analyzes the selected interaction block (e.g., block 134 of FIG. 1). At operation 206, the processor 152 of the interaction management system 150 determines a time (e.g., time 170 of FIG. 1) that passed since performing the interaction associated with the selected interaction block (e.g., block 134 of FIG. 1). At operation 208, the processor 152 of the interaction management system 150 determines if the time (e.g., time 170 of FIG. 1) is less than a time threshold (e.g., time threshold 164 of FIG. 1).

In response to determining at operation 208 that the time (e.g., time 170 of FIG. 1) is greater than or equal to the time threshold (e.g., time threshold 164 of FIG. 1), method 200 continues to operation 210. At operation 210, the processor 152 of the interaction management system 150 determines if a request (e.g., request 172A of FIG. 1) to reverse the interaction associated with the selected interaction block (e.g., block 134 of FIG. 1) is received from the source computing system (e.g., computing system 106A of FIG. 1). For example, a user (e.g., user 104A of FIG. 1) of the source computing system (e.g., computing system 106A of FIG. 1) may determine that the interaction was performed in error and may instruct the source computing system (e.g., computing system 106A of FIG. 1) to send the request (e.g., request 172A of FIG. 1) to the interaction management system 150 to reverse the interaction associated with the selected interaction block (e.g., block 134 of FIG. 1).

In response to determining at operation 208 that the time (e.g., time 170 of FIG. 1) is less than the time threshold (e.g., time threshold 164 of FIG. 1), method 200 continues to operation 212. At operation 212, the processor 152 of the interaction management system 150 determines if the interaction associated with the selected interaction block (e.g., block 134 of FIG. 1) is illegitimate. Determining if the interaction is illegitimate may comprise implementing an AI/ML model (e.g., AI/ML model 160 of FIG. 1) by the processor 152. In certain embodiments, the processor 152 of the interaction management system 150 compares a historical behavior (e.g., historical behavior 166 of FIG. 1) of the source computing system (e.g., computing system 106A of FIG. 1) to a current behavior (e.g., current behavior 168 of FIG. 1) of the source computing system (e.g., computing system 106A of FIG. 1).

In response to determining that the historical behavior (e.g., historical behavior 166 of FIG. 1) of the source computing system (e.g., computing system 106A of FIG. 1) does not match the current behavior (e.g., current behavior 168 of FIG. 1) of the source computing system (e.g., computing system 106A of FIG. 1), the processor 152 of the interaction management system 150 determines that the interaction associated with the selected interaction block (e.g., block 134 of FIG. 1) is illegitimate. In response to determining that the historical behavior (e.g., historical behavior 166 of FIG. 1) of the source computing system (e.g., computing system 106A of FIG. 1) matches the current behavior (e.g., current behavior 168 of FIG. 1) of the source computing system (e.g., computing system 106A of FIG. 1), the processor 152 of the interaction management system 150 determines that the interaction associated with the selected interaction block (e.g., block 134 of FIG. 1) is legitimate.

In response to determining at operation 210 that the request (e.g., request 172A of FIG. 1) to reverse the interaction associated with the selected interaction block (e.g., block 134 of FIG. 1) is received from the source computing system (e.g., computing system 106A of FIG. 1) or in response to determining at operation 212 that the interaction associated with the selected interaction block (e.g., block 134 of FIG. 1) is illegitimate, method 200 continues to operation 214. At operation 214, the processor 152 of the interaction management system 150 sends an instruction (e.g., respective one of instructions 174 of FIG. 1) to the blockchain network 120 to create a dispute block (e.g., block 140 of FIG. 1) associated with disputing of the interaction associated with the selected interaction block (e.g., block 134 of FIG. 1). In response to receiving the instruction (e.g., respective one of instructions 174 of FIG. 1), the blockchain network 120 creates the dispute block (e.g., block 140 of FIG. 1) associated with disputing of the interaction associated with the selected interaction block (e.g., block 134 of FIG. 1). At operation 216, the blockchain network 120 adds the dispute block (e.g., block 140 of FIG. 1) to the blockchain 132.

At operation 218, the processor 152 of the interaction management system 150 determines if the blockchain 132 includes one or more intermediate interaction blocks (e.g., blocks 136 through 138 of FIG. 1) between the selected interaction block (e.g., block 134 of FIG. 1) and the dispute block (e.g., block 140 of FIG. 1). In certain embodiments, one or more interactions may be performed and recorded in the blockchain 132 after performing the interaction associated with the selected interaction block (e.g., block 134 of FIG. 1) and before adding the dispute block (e.g., block 142 of FIG. 1) to the blockchain 132. In certain embodiments, an interaction between the computing system 106B and the computing system 106C may be recorded in the blockchain 132 as a block 136 and an interaction between the computing system 106C and the computing system 106D may be recorded in the blockchain 132 as a block 138.

In response to determining at operation 218 that the blockchain 132 includes the one or more intermediate interaction blocks (e.g., blocks 136 through 138 of FIG. 1)

between the selected interaction block (e.g., block 134 of FIG. 1) and the dispute block (e.g., block 140 of FIG. 1), method 200 continues to operation 220. At operation 220, the processor 152 of the interaction management system 150 determines source computing systems (e.g., computing systems 106A through 106C of FIG. 1) and destination computing systems (e.g., computing systems 106B through 106D of FIG. 1) for the interaction and the one or more subsequent interactions based on the selected interaction block (e.g., block 134 of FIG. 1) and the one or more intermediate interaction blocks (e.g., blocks 136 through 138 of FIG. 1). In certain embodiments, the processor 152 of the interaction management system 150 determines a source computing system and a destination computing system of the interaction associated with the selected interaction block (e.g., block 134 of FIG. 1) as the computing system 106A and the computing system 106B, respectively, a source computing system and a destination computing system of a subsequent interaction associated with the intermediate interaction block 136 as the computing system 106B and the computing system 106C, respectively, and a source computing system and a destination computing system of a subsequent interaction associated with the intermediate interaction block 138 as the computing system 106C and the computing system 106D, respectively.

At operation 222, the processor 152 of the interaction management system 150 determines, based on interaction reversal rules 162, if reversals are approved for the interaction associated with the selected interaction block (e.g., block 134 of FIG. 1) and the one or more subsequent interactions associated with the one or more intermediate interaction blocks (e.g., blocks 136 through 138 of FIG. 1). The interaction reversal rules 162 may include rules based on source computing systems (e.g., respective ones of computing systems 106A through 106D of FIG. 1), rules based on destination computing systems (e.g., respective ones of computing systems 106A through 106D of FIG. 1), rules based on users (e.g., users 104A through 104D of FIG. 1) and/or rules based on types of interactions (e.g., based on types of digital assets 118A through 118D of FIG. 1).

In response to determining at operation 222 that the reversals of the interaction associated with the selected interaction block (e.g., block 134 of FIG. 1) and the one or more subsequent interactions associated with the one or more intermediate interaction blocks (e.g., blocks 136 through 138 of FIG. 1) are approved, method continues to operation 224. At operation 224, the processor 152 of the interaction management system 150 sends an instruction (e.g., respective one of instructions 180B through 180D of FIG. 1) to each destination computing system (e.g. respective one of computing systems 106B through 106D of FIG. 1) to initiate a reversal of a respective interaction (e.g., respective one of interactions associated with the selected interaction block 134 and the intermediate interaction blocks 136 through 138).

At operation 226, the blockchain network 120 creates a reversal block (e.g., respective one of blocks 142 through 144 and 146 of FIG. 1) associated with the reversal of each of the interaction associated with the selected interaction block (e.g., block 134 of FIG. 1) and the one or more subsequent interactions associated with the one or more intermediate interaction blocks (e.g., blocks 136 through 138 of FIG. 1). In certain embodiment, the blockchain network 120 creates a reversal block 142 for a subsequent interaction associated with the intermediate interaction block 138, a reversal block 144 for a subsequent interaction associated with the intermediate interaction block 136, and a reversal block 146 for the interaction associated with the selected interaction block 134.

At operation 228, the blockchain network 120 validates the reversal blocks 142 through 144 and 146 based on proof of importance. The validation process based on proof of importance may comprise a validation process based on proof of authority, a validation process based on proof of work, or a validation process based on proof of stake. At operation 230, the blockchain network 120 adds the reversal blocks 142 through 144 and 146 to the blockchain 132. At operation 232, the processor 152 of the interaction management system 150 sends a notification (e.g., respective one of notifications 176A through 176C of FIG. 1) to each source computing system (e.g., respective one of computing systems 106A through 106C of FIG. 1) that the reversal of the respective interaction is approved.

In response to determining at operation 218 that the blockchain 132 does not includes the one or more intermediate interaction blocks (e.g., blocks 136 through 138 of FIG. 1) between the selected interaction block (e.g., block 134 of FIG. 1) and the dispute block (e.g., block 140 of FIG. 1), method 200 continues to operation 234. At operation 234, the processor 152 of the interaction management system 150 determines a source computing system (e.g., computing system 106A of FIG. 1) and a destination computing system (e.g., computing system 106B of FIG. 1) for the selected interaction block (e.g., block 134 of FIG. 1). At operation 236, the processor 152 of the interaction management system 150 determines, based on interaction reversal rules 162, if a reversal is approved for the interaction associated with the selected interaction block (e.g., block 134 of FIG. 1).

In response to determining at operation 222 that the reversals of the interaction associated with the selected interaction block (e.g., block 134 of FIG. 1) and the one or more subsequent interactions associated with the one or more intermediate interaction blocks (e.g., blocks 136 through 138 of FIG. 1) are not approved or in response to determining at operation 236 that the reversal of the interaction associated with the selected interaction block (e.g., block 134 of FIG. 1) is not approved, method 200 continues to operation 238. At operation 238, the processor 152 of the interaction management system 150 sends an instruction (e.g., respective one of instructions 174 of FIG. 1) to the blockchain network 120 to create a denial block (e.g., block 148 of FIG. 1) associated with a dispute denial. In response to receiving the instruction (e.g., respective one of instructions 174 of FIG. 1), the blockchain network 120 creates the denial block (e.g., block 148 of FIG. 1). At operation 240, the blockchain network 120 adds the denial block (e.g., block 148 of FIG. 1) to the blockchain 132. At operation 242, the processor 152 of the interaction management system 150 sends a notification (e.g., notifications 176A of FIG. 1) to the source computing system (e.g., computing system 106A of FIG. 1) associated with the selected interaction block (e.g., block 134 of FIG. 1) that the reversal of the interaction associated with the selected interaction block (e.g., block 134 of FIG. 1) is denied.

In response to determining at operation 236 that the reversal of the interaction associated with the selected interaction block (e.g., block 134 of FIG. 1) is approved, method 200 continues to operation 244. At operation 244, the processor 152 of the interaction management system 150 sends an instruction (e.g., instruction 180A of FIG. 1) to the source computing system (e.g., computing system 106A of FIG. 1) associated with the selected interaction block (e.g., block 134 of FIG. 1) to initiate a reversal of the interaction associated with the selected interaction block (e.g., block

134 of FIG. 1). At operation 246, the blockchain network 120 creates a reversal block (e.g., block 146 of FIG. 1) associated with a reversal of the interaction associated with the selected interaction block (e.g., block 134 of FIG. 1).

At operation 248, the blockchain network 120 validates the reversal block 146 based on proof of importance. The validation process based on proof of importance may comprise a validation process based on proof of authority, a validation process based on proof of work, or a validation process based on proof of stake. At operation 250, the blockchain network 120 adds the reversal block 146 to the blockchain 132. At operation 252, the processor 152 of the interaction management system 150 sends a notification (e.g., notification 176A of FIG. 1) to the source computing system (e.g., computing system 106A) associated with the selected interaction block (e.g., block 134 of FIG. 1) that the reversal of the interaction associated with the selected interaction block (e.g., block 134 of FIG. 1) is approved.

In response to determining at operation 212 that the interaction associated with the selected interaction block (e.g., block 134 of FIG. 1) is legitimate, or after performing operation 232, 242 or 252, method continues to operation 254. At operation 254, the processor 152 of the interaction management system 150 determines whether to stop the interaction monitoring process. In certain embodiments, the processor 152 of the interaction management system 150 determines to stop the interaction monitoring process in response to receiving an instruction (e.g., instruction 178 of FIG. 1) to stop the interaction monitoring process. In response to determining at operation 254 not to stop the interaction monitoring process, method 200 continues to operation 256. At operation 256, the processor 152 of the interaction management system 150 selects an unanalyzed interaction block of the blockchain 132. After performing operation 256, method 200 continues back to operation 204. In certain embodiments, operations 204 through 256 are performed one or more times until the processor 152 of the interaction management system 150 determines to stop the interaction monitoring process. In response to determining at operation 254 to stop the interaction monitoring process, method 200 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

a memory configured to store:

a time threshold; and interaction reversal rules; and a processor operably coupled to the memory and configured to:

analyze a first block of a blockchain stored in a blockchain network, wherein the first block is associated with a first interaction between a first source computing system and a first destination computing system;

determine a first time that passed since performing the first interaction; and in response to determining that the first time is less than the time threshold:

determine if the first interaction is illegitimate; and in response to determining that the first interaction is illegitimate:

send a first instruction to the blockchain network to:

create a first dispute block associated with a dispute of the first interaction; and add the first dispute block to the blockchain;

determine if the blockchain comprises one or more first intermediate blocks between the first block and the first dispute block, wherein the one or more first intermediate blocks are associated with one or more first subsequent interactions that are performed after the first interaction; and in response to determining that the blockchain comprises the one or more first intermediate blocks between the first block and the first dispute block:

determine first source computing systems and first destination computing systems for the first interaction and the one or more first subsequent interactions based on the first block and the one or more first intermediate blocks;

determine, based on the interaction reversal rules, if reversals of the first interaction and the one or more first subsequent interactions are approved; and in response to determining that the reversals of the first interaction and the one or more first subsequent interactions are approved:

send a second instruction to each first destination computing system to initiate a reversal of a first respective interaction, wherein, in response to initiating the reversal of the first respective interaction, the blockchain network is configured to:

create a first reversal block associated with the reversal of the first respective interaction;

validate the first reversal block; and add the first reversal block to the blockchain; and send a first notification to each first source computing system that the reversal of the first respective interaction is approved.

2. The system of claim 1, wherein the processor is further configured to:

analyze a second block of the blockchain, wherein the second block is associated with a second interaction between a second source computing system and a second destination computing system;

determine a second time that passed since performing the second interaction; and in response to determining that the second time is greater than or equal to the time threshold:

determine if a first request to reverse the second interaction is received from the second source computing system; and in response to determining that the first request is received:

send a third instruction to the blockchain network to:

create a second dispute block associated with a dispute of the second interaction; and add the second dispute block to the blockchain;

determine if the blockchain comprises one or more second intermediate blocks between the second block and the second dispute block, wherein the one or more second intermediate blocks are associated with one or more second subsequent interactions that are performed after the second interaction; and in response to determining that the blockchain comprises the one or more second intermediate blocks between the second block and the second dispute block:

determine second source computing systems and second destination computing systems for the second interaction and the one or more second subsequent interactions based on the second block and the one or more second intermediate blocks;

determine, based on the interaction reversal rules, if reversals of the second interaction and the one or more second subsequent interactions are approved; and in response to determining that the reversals of the second interaction and the one or more second subsequent interactions are approved:

send a fourth instruction to each second destination computing system to initiate a reversal of a second respective interaction, wherein, in response to initiating the reversal of the second respective interaction, the blockchain network is further configured to:

create a second reversal block associated with the reversal of the second respective interaction;

validate the second reversal block; and add the second reversal block to the blockchain; and send a second notification to each second source computing system that the reversal of the second respective interaction is approved.

3. The system of claim 1, wherein the processor is further configured to:

analyze a third block of the blockchain, wherein the third block is associated with a third interaction between a third source computing system and a third destination computing system;

determine a third time that passed since performing the third interaction; and in response to determining that the third time is less than the time threshold:

determine if the third interaction is illegitimate; and in response to determining that the third interaction is illegitimate:

send a fifth instruction to the blockchain network to:
    create a third dispute block associated with a
        dispute of the third interaction; and
    add the third dispute block to the blockchain;
determine if the blockchain comprises one or more
    third intermediate blocks between the third block
    and the third dispute block; and
in response to determining that the blockchain com-
    prises no intermediate blocks between the third
    block and the third dispute block:
    determine the third source computing system and
        the third destination computing system for the
        third interaction based on the third block;
    determine, based on the interaction reversal rules,
        if a reversal of the third interaction is approved;
        and
    in response to determining that the reversal of the
        third interaction is approved:
        send a sixth instruction to the third destination
        computing system to initiate a reversal of the
        third interaction, wherein, in response to initi-
        ating the reversal of the third interaction, the
        blockchain network is further configured to:
        create a third reversal block associated with the
        reversal of the third interaction;
        validate the third reversal block; and
        add the third reversal block to blockchain; and
        send a third notification to the third source
        computing system that the reversal of the third
        interaction is approved.
4. The system of claim 1, wherein the processor is further
configured to:
    analyze a fourth block of the blockchain, wherein the
        fourth block is associated with a fourth interaction
        between a fourth source computing system and a fourth
        destination computing system;
    determine a fourth time that passed since performing the
        fourth interaction; and
    in response to determining that the fourth time is greater
        than or equal to the time threshold:
        determine if a second request to reverse the fourth
            interaction is received from the fourth source com-
            puting system; and
        in response to determining that the second request is
            received:
        send a seventh instruction to the blockchain network
            to:
            create a fourth dispute block associated with a
                dispute of the fourth interaction; and
            add the fourth dispute block to the blockchain;
        determine if the blockchain comprises one or more
            fourth intermediate blocks between the fourth
            block and the fourth dispute block; and
        in response to determining that the blockchain com-
            prises no intermediate blocks between the fourth
            block and the fourth dispute block:
            determine the fourth source computing system and
                the fourth destination computing system based
                on the fourth block;
            determine, based on the interaction reversal rules,
                if a reversal of the fourth interaction is
                approved; and
            in response to determining that the reversal of the
                fourth interaction is approved:
                send an eighth instruction to each the fourth
                destination computing system to initiate the
                reversal of the fourth interaction, wherein, in response to initiating the reversal of the fourth
interaction, the blockchain network is further
configured to:
    create a fourth reversal block associated with
    the reversal of the fourth interaction;
    validate the fourth reversal block; and
    add the fourth reversal block to blockchain; and
    send a fourth notification to the fourth source
    computing system that the reversal of the fourth
    interaction is approved.
5. The system of claim 1, wherein determining if the first
interaction is illegitimate comprises:
    comparing a historical behavior of the first source com-
        puting system to a current behavior of the first source
        computing system;
    in response to determining that the historical behavior
        matches the current behavior, determine that the first
        interaction is legitimate; and
    in response to determining that the historical behavior
        does not match the current behavior, determine that the
        first interaction is illegitimate.
6. The system of claim 1, wherein the interaction reversal
rules comprise:
    rules based on source computing systems;
    rules based on destination computing systems; and
    rules based on types of interactions.
7. The system of claim 1, wherein determining if the first
interaction is illegitimate comprises implementing an arti-
ficial intelligence/machine learning model by the processor.
8. A method comprising:
    analyzing a first block of a blockchain stored in a block-
        chain network, wherein the first block is associated
        with a first interaction between a first source computing
        system and a first destination computing system;
    determining a first time that passed since performing the
        first interaction; and
    in response to determining that the first time is less than
        a time threshold:
        determining if the first interaction is illegitimate; and
        in response to determining that the first interaction is
            illegitimate:
            sending a first instruction to the blockchain network
                to:
                create a first dispute block associated with a
                    dispute of the first interaction; and
                add the first dispute block to the blockchain;
            determining if the blockchain comprises one or more
                first intermediate blocks between the first block
                and the first dispute block, wherein the one or
                more first intermediate blocks are associated with
                one or more first subsequent interactions that are
                performed after the first interaction; and
            in response to determining that the blockchain com-
                prises the one or more first intermediate blocks
                between the first block and the first dispute block:
                determining first source computing systems and
                    first destination computing systems for the first
                    interaction and the one or more first subsequent
                    interactions based on the first block and the one
                    or more first intermediate blocks;
                determining, based on interaction reversal rules, if
                    reversals of the first interaction and the one or
                    more first subsequent interactions are approved;
                    and
                in response to determining that the reversals of the
                    first interaction and the one or more first sub-
                    sequent interactions are approved:

sending a second instruction to each first destination computing system to initiate a reversal of a first respective interaction, wherein, in response to initiating the reversal of the first respective interaction, the blockchain network is configured to:
create a first reversal block associated with the reversal of the first respective interaction;
validate the first reversal block; and
add the first reversal block to the blockchain; and
sending a first notification to each first source computing system that the reversal of the first respective interaction is approved.

9. The method of claim 8, further comprising:
analyzing a second block of the blockchain, wherein the second block is associated with a second interaction between a second source computing system and a second destination computing system;
determining a second time that passed since performing the second interaction; and
in response to determining that the second time is greater than or equal to the time threshold:
determining if a first request to reverse the second interaction is received from the second source computing system; and
in response to determining that the first request is received:
sending a third instruction to the blockchain network to:
create a second dispute block associated with a dispute of the second interaction; and
add the second dispute block to the blockchain;
determining if the blockchain comprises one or more second intermediate blocks between the second block and the second dispute block, wherein the one or more second intermediate blocks are associated with one or more second subsequent interactions that are performed after the second interaction; and
in response to determining that the blockchain comprises the one or more second intermediate blocks between the second block and the second dispute block:
determining second source computing systems and second destination computing systems for the second interaction and the one or more second subsequent interactions based on the second block and the one or more second intermediate blocks;
determining, based on the interaction reversal rules, if reversals of the second interaction and the one or more second subsequent interactions are approved; and
in response to determining that the reversals of the second interaction and the one or more second subsequent interactions are approved:
sending a fourth instruction to each second destination computing system to initiate a reversal of a second respective interaction, wherein, in response to initiating the reversal of the second respective interaction, the blockchain network is further configured to:
create a second reversal block associated with the reversal of the second respective interaction;
validate the second reversal block; and add the second reversal block to the blockchain; and
sending a second notification to each second source computing system that the reversal of the second respective interaction is approved.

10. The method of claim 8, further comprising:
analyzing a third block of the blockchain, wherein the third block is associated with a third interaction between a third source computing system and a third destination computing system;
determining a third time that passed since performing the third interaction; and
in response to determining that the third time is less than the time threshold:
determining if the third interaction is illegitimate; and
in response to determining that the third interaction is illegitimate:
sending a fifth instruction to the blockchain network to:
create a third dispute block associated with a dispute of the third interaction; and
add the third dispute block to the blockchain;
determining if the blockchain comprises one or more third intermediate blocks between the third block and the third dispute block; and
in response to determining that the blockchain comprises no intermediate blocks between the third block and the third dispute block:
determining the third source computing system and the third destination computing system for the third interaction based on the third block;
determining, based on the interaction reversal rules, if a reversal of the third interaction is approved; and
in response to determining that the reversal of the third interaction is approved:
sending a sixth instruction to the third destination computing system to initiate a reversal of the third interaction, wherein, in response to initiating the reversal of the third interaction, the blockchain network is further configured to:
create a third reversal block associated with the reversal of the third interaction;
validate the third reversal block; and
add the third reversal block to blockchain; and
sending a third notification to the third source computing system that the reversal of the third interaction is approved.

11. The method of claim 8, further comprising:
analyzing a fourth block of the blockchain, wherein the fourth block is associated with a fourth interaction between a fourth source computing system and a fourth destination computing system;
determining a fourth time that passed since performing the fourth interaction; and
in response to determining that the fourth time is greater than or equal to the time threshold:
determining if a second request to reverse the fourth interaction is received from the fourth source computing system; and
in response to determining that the second request is received:
sending a seventh instruction to the blockchain network to:
create a fourth dispute block associated with a dispute of the fourth interaction; and
add the fourth dispute block to the blockchain;

determining if the blockchain comprises one or more fourth intermediate blocks between the fourth block and the fourth dispute block; and in response to determining that the blockchain comprises no intermediate blocks between the fourth block and the fourth dispute block:

determining the fourth source computing system and the fourth destination computing system based on the fourth block;

determining, based on the interaction reversal rules, if a reversal of the fourth interaction is approved; and in response to determining that the reversal of the fourth interaction is approved:

sending an eighth instruction to each the fourth destination computing system to initiate the reversal of the fourth interaction, wherein, in response to initiating the reversal of the fourth interaction, the blockchain network is further configured to:

create a fourth reversal block associated with the reversal of the fourth interaction;

validate the fourth reversal block; and add the fourth reversal block to blockchain; and sending a fourth notification to the fourth source computing system that the reversal of the fourth interaction is approved.

12. The method of claim 8, wherein determining if the first interaction is illegitimate comprises:

comparing a historical behavior of the first source computing system to a current behavior of the first source computing system;

in response to determining that the historical behavior matches the current behavior, determine that the first interaction is legitimate; and in response to determining that the historical behavior does not match the current behavior, determine that the first interaction is illegitimate.

13. The method of claim 8, wherein the interaction reversal rules comprise:

rules based on source computing systems;

rules based on destination computing systems; and rules based on types of interactions.

14. The method of claim 8, wherein determining if the first interaction is illegitimate comprises implementing an artificial intelligence/machine learning model.

15. A non-transitory computer-readable medium storing instructions that, when executed by one or more processors, cause the one or more processors to:

analyze a first block of a blockchain stored in a blockchain network, wherein the first block is associated with a first interaction between a first source computing system and a first destination computing system;

determine a first time that passed since performing the first interaction; and in response to determining that the first time is less than a time threshold:

determine if the first interaction is illegitimate; and in response to determining that the first interaction is illegitimate:

send a first instruction to the blockchain network to:

create a first dispute block associated with a dispute of the first interaction; and add the first dispute block to the blockchain;

determine if the blockchain comprises one or more first intermediate blocks between the first block and the first dispute block, wherein the one or more first intermediate blocks are associated with one or more first subsequent interactions that are performed after the first interaction; and in response to determining that the blockchain comprises the one or more first intermediate blocks between the first block and the first dispute block:

determine first source computing systems and first destination computing systems for the first interaction and the one or more first subsequent interactions based on the first block and the one or more first intermediate blocks;

determine, based on interaction reversal rules, if reversals of the first interaction and the one or more first subsequent interactions are approved; and in response to determining that the reversals of the first interaction and the one or more first subsequent interactions are approved:

send a second instruction to each first destination computing system to initiate a reversal of a first respective interaction, wherein, in response to initiating the reversal of the first respective interaction, the blockchain network is configured to:

create a first reversal block associated with the reversal of the first respective interaction;

validate the first reversal block; and add the first reversal block to the blockchain; and send a first notification to each first source computing system that the reversal of the first respective interaction is approved.

16. The non-transitory computer-readable medium of claim 15, wherein the instructions, when executed by the one or more processors, further cause the one or more processors to:

analyze a second block of the blockchain, wherein the second block is associated with a second interaction between a second source computing system and a second destination computing system;

determine a second time that passed since performing the second interaction; and in response to determining that the second time is greater than or equal to the time threshold:

determine if a first request to reverse the second interaction is received from the second source computing system; and in response to determining that the first request is received:

send a third instruction to the blockchain network to:

create a second dispute block associated with a dispute of the second interaction; and add the second dispute block to the blockchain;

determine if the blockchain comprises one or more second intermediate blocks between the second block and the second dispute block, wherein the one or more second intermediate blocks are associated with one or more second subsequent interactions that are performed after the second interaction; and in response to determining that the blockchain comprises the one or more second intermediate blocks between the second block and the second dispute block:

determine second source computing systems and second destination computing systems for the second interaction and the one or more second subsequent interactions based on the second block and the one or more second intermediate blocks;

determine, based on the interaction reversal rules, if reversals of the second interaction and the one or more second subsequent interactions are approved; and in response to determining that the reversals of the second interaction and the one or more second subsequent interactions are approved:

send a fourth instruction to each second destination computing system to initiate a reversal of a second respective interaction, wherein, in response to initiating the reversal of the second respective interaction, the blockchain network is further configured to:

create a second reversal block associated with the reversal of the second respective interaction;

validate the second reversal block; and add the second reversal block to the blockchain; and send a second notification to each second source computing system that the reversal of the second respective interaction is approved.

17. The non-transitory computer-readable medium of claim 15, wherein the instructions, when executed by the one or more processors, further cause the one or more processors to:

analyze a third block of the blockchain, wherein the third block is associated with a third interaction between a third source computing system and a third destination computing system;

determine a third time that passed since performing the third interaction; and in response to determining that the third time is less than the time threshold:

determine if the third interaction is illegitimate; and in response to determining that the third interaction is illegitimate:

send a fifth instruction to the blockchain network to:

create a third dispute block associated with a dispute of the third interaction; and add the third dispute block to the blockchain;

determine if the blockchain comprises one or more third intermediate blocks between the third block and the third dispute block; and in response to determining that the blockchain comprises no intermediate blocks between the third block and the third dispute block:

determine the third source computing system and the third destination computing system for the third interaction based on the third block;

determine, based on the interaction reversal rules, if a reversal of the third interaction is approved; and in response to determining that the reversal of the third interaction is approved:

send a sixth instruction to the third destination computing system to initiate a reversal of the third interaction, wherein, in response to initiating the reversal of the third interaction, the blockchain network is further configured to:

create a third reversal block associated with the reversal of the third interaction;

validate the third reversal block; and add the third reversal block to blockchain; and send a third notification to the third source computing system that the reversal of the third interaction is approved.

18. The non-transitory computer-readable medium of claim 15, wherein the instructions, when executed by the one or more processors, further cause the one or more processors to:

analyze a fourth block of the blockchain, wherein the fourth block is associated with a fourth interaction between a fourth source computing system and a fourth destination computing system;

determine a fourth time that passed since performing the fourth interaction; and in response to determining that the fourth time is greater than or equal to the time threshold:

determine if a second request to reverse the fourth interaction is received from the fourth source computing system; and in response to determining that the second request is received:

send a seventh instruction to the blockchain network to:

create a fourth dispute block associated with a dispute of the fourth interaction; and add the fourth dispute block to the blockchain;

determine if the blockchain comprises one or more fourth intermediate blocks between the fourth block and the fourth dispute block; and in response to determining that the blockchain comprises no intermediate blocks between the fourth block and the fourth dispute block:

determine the fourth source computing system and the fourth destination computing system based on the fourth block;

determine, based on the interaction reversal rules, if a reversal of the fourth interaction is approved; and in response to determining that the reversal of the fourth interaction is approved:

send an eighth instruction to each the fourth destination computing system to initiate the reversal of the fourth interaction, wherein, in response to initiating the reversal of the fourth interaction, the blockchain network is further configured to:

create a fourth reversal block associated with the reversal of the fourth interaction;

validate the fourth reversal block; and add the fourth reversal block to blockchain; and send a fourth notification to the fourth source computing system that the reversal of the fourth interaction is approved.

19. The non-transitory computer-readable medium of claim 15, wherein determining if the first interaction is illegitimate comprises:

comparing a historical behavior of the first source computing system to a current behavior of the first source computing system;

in response to determining that the historical behavior matches the current behavior, determine that the first interaction is legitimate; and in response to determining that the historical behavior does not match the current behavior, determine that the first interaction is illegitimate.

20. The non-transitory computer-readable medium of claim 15, wherein the interaction reversal rules comprise:

rules based on source computing systems;

rules based on destination computing systems; and
rules based on types of interactions.

\* \* \* \* \*